(12) United States Patent
Kretz et al.

(10) Patent No.: US 8,140,109 B2
(45) Date of Patent: Mar. 20, 2012

(54) METHOD OF OPERATING A MOBILE ELECTRONIC DEVICE AND MOBILE ELECTRONIC DEVICE

(75) Inventors: Martin Kretz, Lund (SE); Fredrik Ekstrand, Malmo (SE)

(73) Assignee: Sony Ericsson Mobile Communications AB, Lund (SE)

( * ) Notice: Subject to any disclaimer, the term of this patent is extended or adjusted under 35 U.S.C. 154(b) by 622 days.

(21) Appl. No.: 12/277,079

(22) Filed: Nov. 24, 2008

(65) Prior Publication Data

US 2010/0130183 A1    May 27, 2010

(51) Int. Cl.
*H04M 1/00* (2006.01)
*H04M 3/00* (2006.01)

(52) U.S. Cl. ..................... 455/550.1; 455/418

(58) Field of Classification Search .................. 455/418, 455/550.1

See application file for complete search history.

(56) References Cited

U.S. PATENT DOCUMENTS 6,961,574 B1 * 11/2005 Stage et al. .................... 455/445
2004/0248566 A1 * 12/2004 Suzuki .......................... 455/418

FOREIGN PATENT DOCUMENTS

EP    1494418    1/2005
GB    2348083    9/2000

* cited by examiner

*Primary Examiner* — Nick Corsaro
*Assistant Examiner* — Joel Ajayi
(74) *Attorney, Agent, or Firm* — Peter F. Corless; Steven M. Jensen; Edwards Wildman Palmer LLP

(57) ABSTRACT

A method of operating a mobile electronic device, a mobile electronic device, as well as a method of operating a server and a sever are disclosed. The mobile electronic device comprises a receiver unit, a processing unit, a memory and an input unit. The memory stores a plurality of data objects which may be selected by a user of the mobile electronic device.

17 Claims, 7 Drawing Sheets

400

| 401 | 402 | 403 | 404 |
| --- | --- | --- | --- |
| DATA OBJECT TYPE | ACTION | APPLICATION | LOCATION |
| .JPG; .BMP; .PNG | UPLOAD TO FLICKR | FLICKR-UPLOAD.EXE | 100.200.0.1 |
| .JPG | VIEW WITH PICV | PICV1.1 | 100.100.0.2 |
| .MPG | UPLOAD TO YOUTUBE | U-UPLOADER.EXE | 100.200.0.1 |
| ADDRESS/vCARD | SYNCHRONIZE | SYNC-APP.EXE | 100.200.0.1 |
| PHONE NUMBER | SEND MEDIA MESSAGE | MESSAGE-SEND.EXE | 100.200.0.1 |

| DATA OBJECT TYPE | ACTION | APPLICATION | TYPE | SIZE |
|---|---|---|---|---|
| .JPG | SHOW | LOCAL PIC. VIEWER | L | N/A |
|  | UPLOAD TO FLICKR | PROXY APPLICATION | R | 100kB |
|  | VIEW WITH PICV | PROXY APPLICATION | R | 500kB |
| .MPG | SHOW | LOCAL MOVIE PLAYER | L | N/A |

*FIG. 5*

METHOD OF OPERATING A MOBILE ELECTRONIC DEVICE AND MOBILE ELECTRONIC DEVICE

FIELD OF THE INVENTION

The present invention relates to mobile electronic devices, such as mobile phones or personal digital assistants, and to a method of operating a mobile electronic device. The invention further relates to a server storing a plurality of applications, and a method of operating such a server.

BACKGROUND

Modern electronic devices, such as mobile phones or personal digital assistants, often provide the user with a range of functionalities. The mobile electronic devices can store content for example in the form of data objects, such as media files, e.g. images, videos or audio files, addresses, phone numbers, network addresses, e.g. uniform resource locators (URLs), and the like. The mobile electronic devices run applications that are capable of performing certain actions on a data object, such as displaying an image file, playing back an audio file, opening a URL or updating address information. The applications can be pre-installed on the mobile electronic device when the mobile electronic device is sold, or may be later added manually by the user.

If a user would like to handle a certain type of content on a conventional electronic device, such as an image file, the user has to remember what kind of applications are installed on the mobile electronic device that are capable of handling the type of content, or he has to search through the installed applications in order to find an appropriate application. The user may also not know that a certain installed application has a functionality for the type of content handled. This approach to handling content or data objects is rather time consuming and ineffective, and the full functionality of the installed applications may not be used. The actions that can be performed on a data object are further limited by the installed applications.

For increasing the functionality of the mobile electronic device, a user can manually install a new application or a new version of an already installed application. Yet generally, the user will not be aware of the fact that a new application capable of handling a certain type of data object exists. The user may only accidentally obtain such information, e.g. from friends, by reading or by another external information source, or he may have to explicitly search for new applications. Remembering the existence of a new application or searching actively for new applications both require a substantial amount of effort by the user, and both methods are still not able to provide the user with the latest functionalities. Conventional mobile electronic devices accordingly have a limited functionality, and increasing the functionality is time consuming and ineffective. This problem can also not be overcome by pre-installing a larger number of applications, as the pre-installed applications require storage space on the mobile electronic device and thus increase associated costs. Further, these applications may never be used, rendering their installation undesirable. Keeping the available functions up to date on a conventional mobile electronic device is thus at present either hardly possible or impractical.

It is thus desirable to keep the functionality of a mobile electronic device up to date without requiring a substantial effort by the user. It is also desirable to provide an increased range of functions for a particular type of data object without having to provide a large number of pre-installed applications. Further, it is desirable to make a mobile electronic device capable of implementing new functionalities both of already installed applications and of new applications, as soon as they become available.

SUMMARY OF THE INVENTION

Accordingly, there is a need to provide a mobile electronic device with an improved functionality. Further, there is a need for a fast and efficient way of providing new functions on a mobile electronic device.

According to a first aspect of the invention, a method of operating a mobile electronic device is provided, the method comprising the step of receiving at the mobile electronic device information on at least one action an application is capable of performing on at least one type of data object. The at least one action is associated with the application and the at least one type of data object. The information is received for a plurality of applications stored on at least one remote server. Further, the at least one action comprised in the received information is registered for the at least one associated type of data object as a remote action in the mobile electronic device. In response to a user selecting a data object of a type for which at least one remote action is registered, the data object being stored on the mobile electronic device, a list of actions for the selected data object is provided to the user at the mobile electronic device. The list of actions comprises at least one of the remote actions registered for the type of the selected data object.

As the user may be provided with an action corresponding to an application stored on a remote server when selecting the data object, the number of available actions that can be provided for the selected data object can be increased. Accordingly, the functionality of the mobile electronic device can be improved. Further, as the information on the corresponding action may e.g. be received from a remote server, the actions available for a certain type of data object on the mobile electronic device may always be kept up to date. The new functionality in form of the newly registered action may be provided to the user without the need for installing the associated application on the mobile electronic device. Accordingly, less storage space may be required on the mobile electronic device. The method may be performed automatically by the mobile electronic device. Accordingly, there may be no effort required by the user. Further, the new functionality in form of the newly registered action may be provided in a fast and efficient way.

According to an embodiment of the invention, the method further comprises downloading the associated application from the remote server to the mobile electronic device in response to the user selecting the at least one remote action provided with the list of actions. The downloaded application is then executed on the mobile electronic device for performing the action corresponding to the selected remote action with the selected data object. As the downloading and the executing of the associated application may be performed automatically, the user does not need to manually install the associated application for using the increased functionality. It is also possible to perform the action 'online', with the application being executed on the server.

After downloading, the application may be installed on the mobile electronic device and the action associated with the installed application may be registered as a local action local to the mobile electronic device. The next time the user selects the action, the downloading and the installing may thus not need to be performed, as the action is registered as a local action, and the associated application may directly be executed on the mobile electronic device. As said before, the action a may also be performed online, and the installation may then simply comprise a link to a server on which the application is running. The mobile electronic device may then supply data for processing to the server and may receive processed data from the server.

In response to the user selecting the at least one remote action provided with the list of actions, a request may be issued at the mobile electronic device to the user on whether the application associated with the selected remote action should be downloaded from the remote server to the mobile electronic device, wherein the downloading and the executing is only performed in response to the user answering the request in the affirmative. An unwanted automatic installation of the application may thus be prevented, and downloading costs as well as storage space on the mobile electronic device may thus be saved.

According to an embodiment, the at least one remote action comprised in the list of actions is selected from plural remote actions registered for the type of the selected data object according to a predetermined criterion. For example in a case where a large number of actions is registered for a particular type of data object, the number of actions provided to a user in the list of actions can be reduced, thus facilitating the selection of an action by the user. The list of actions may for example be limited to a predetermined number of local actions and remote actions. The predetermined criterion may for example be selected from a group comprising a rating of the remote actions, a recommendation of remote actions by other users, and a frequency of use of the remote actions. The actions provided in the list of actions may also be promoted actions supplied by an advertisement provider. By adding such an advertisement, the user may retrieve a corresponding application free of charge. In other cases, the user may be charged for using the application, e.g. when downloading an application. Also, a trial version may first be downloaded with e.g. limited features or usage time. Also, an application provider may be charged for having his application added to the list of actions.

The registering of the at least one action comprised in the received information may comprise associating the at least one action with a proxy application running locally on the mobile electronic device. The proxy application may be capable of connecting to a remote server having the application associated with the at least one action stored thereon. In response to the user selecting the at least one remote action comprised in the list of actions, the proxy application may be executed and may identify an application associated with the selected remote action and a remote server having the application stored thereon. The proxy application may further download the application from the identified remote server to the mobile electronic device, install the downloaded application on the mobile electronic device, register at the mobile electronic device, the selected remote action as a local action of the installed application and run the installed application on the mobile electronic device for performing the action corresponding to the registered local action on the selected data object. The proxy application may thus ensure that the action selected by the user is performed on the selected data object.

The information may be received by the proxy application. The proxy application may be configured to download data comprising the information from a remote server to the mobile electronic device and to perform the registering, the downloading of the data being time and/or event trigger. The proxy application may for example at predetermined times or after predetermined periods check on a remote server if new information is available, which may ensure that the mobile electronic device is always provided with the latest functionality. The mobile electronic device may also check for new information after the occurrence of a predetermined event, such as switching on the mobile electronic device, or the actuation of a particular control element of the mobile electronic device. Updates of available actions may also be "pushed out" by the server. This may occur by the server sending e.g. an SMS or an MMS to the mobile electronic device.

According to another embodiment, the method further comprises the step of providing an information element for the at least one remote action in said list of actions. The information element may comprise at least one indication selected from a group comprising: an indication that the remote action corresponds to an application not locally stored on the mobile electronic device; an indication on a size of the application corresponding to the remote action, and an indication on an amount of time expected to be required for downloading the application corresponding to the remote action to the mobile electronic device. Accordingly, the user is enabled to judge whether he wishes to download the application performing the remote action. Time required for downloading the application and the associated costs may thus be saved. Other indications that may be provided comprise a cost associated with downloading the application, a provider of the application, a stability, a popularity of the application, a review or scoring of the application, a comparison to another service, an indication as a suggestion by a friend or an indication of frequency of use of the application by a friend.

The list of actions may further comprise at least one local action which can be performed by an associated application running locally on the mobile electronic device. A user may thus be provided with the choice of performing a local action or a remote action.

According to another aspect of the invention, a mobile electronic device comprising a receiver unit is provided. The receiver unit is adapted to receive information on at least one action an application is capable of performing on at least one type of data object, the at least one action being associated with the application and the at least one type of data object. The receiver unit is adapted to receive the information for a plurality of applications stored on at least one remote server. The mobile electronic device further comprises a processing unit adapted to register the at least one action comprised in the received information for the at least one associated type of data object as a remote action. The mobile electronic device has a memory to store a plurality of data objects and an input unit to enable a user of the mobile electronic device to select one of the data objects stored in the memory. The processing unit is further adapted to, in response to a user selecting one of the data objects of a type for which at least one remote action is registered, provide a list of actions for the selected data object to the user. The list of actions comprises at least one of the remote actions registered for the type of the selected data object.

Such a mobile electronic device may achieve similar advantages as outlined above. In particular, such a mobile device may provide an improved functionality. It may for example register new remote actions as soon as the associated applications become available on the remote server.

According to an embodiment, the processing unit may be further adapted to run a proxy application, the at least one registered remote action being linked to the proxy application. The proxy application may be capable of connecting to a remote server having the application associated with the at least one remote action stored thereon.

The proxy application may be configured to perform the following steps in response to the user selecting the at one remote action comprised in the list of actions: identifying an application associated with the selected remote action and a remote server having the application stored thereon; downloading the application from the identified remote server to the mobile electronic device; installing the downloaded application on the mobile electronic device; registering at the mobile electronic device the selected remote action as a local action of the installed application and running the installed application on the mobile electronic device for performing the action corresponding to the registered local action on the selected data object.

The memory may be adapted to store an association list comprising at least one data object type stored in association with at least one associated action comprised in the received information and an identifier of the associated application. The list may further comprise an identifier of a remote server on which the associated application is available. When the remote action is selected by a user, the mobile electronic device may thus be capable of identifying the associated action and the location at which it is available.

The processing unit may be further adapted to include the at least one remote action in the list of actions on a basis of a predetermined criterion.

The mobile electronic device may be a mobile phone, a personal digital assistant, a portable media player, a portable communication device, a vehicle computer or a portable computer.

The mobile electronic device may be further adapted so as to perform one of the above-mentioned methods.

According to another aspect of the invention, a method of operating a server storing a plurality of applications is provided. The method comprises generating, at the server, data comprising information on at least one action an application stored on the server is capable of performing on at least one type of data object, providing the generated data to at least one mobile electronic device and, in response to receiving at the server a request from the at least one electronic device for the application capable of performing the at least one action comprised in the information, providing the application to the at least one mobile electronic device. A server configured in such a way may both provide data, e.g. called meta data, to a mobile electronic device for increasing the functionality of the mobile electronic device and for providing the mobile electronic device with the latest available actions, and may also provide the corresponding applications for download.

According to another aspect of the invention, a server adapted to provide an application to a mobile electronic device comprising a memory unit adapted to store a plurality of applications, a processing unit adapted to generate data comprising information on at least one action an application stored on a server is capable of performing on at least one type of data object and a network interface adapted to provide the generated data to at least one electronic device is provided. The processing unit is further adapted to provide, in response to receiving a request from the at least one mobile electronic device for the application capable of performing the at least one action comprised in the information, the application to the at least one mobile electronic device via said network interface.

It is to be understood that the features mentioned above and those yet to be explained below can be used not only in respective combinations indicated, but also in other combinations or in isolation, without leaving the scope of the present invention. Features of the above-mentioned aspects and embodiments may be combined to form new embodiments.

BRIEF DESCRIPTION OF THE DRAWINGS

The foregoing and other features and advantages of the invention will become further apparent from the following detailed description read in conjunction with the accompanying drawings, in which like reference numerals refer to like elements.

FIG. 4 schematically illustrates information comprised in meta data provided by a server to a mobile electronic device according to an embodiment of the invention.

FIG. 5 schematically illustrates data object types registered at a mobile electronic device according to an embodiment of the invention.

DETAILED DESCRIPTION OF THE INVENTION

Figure 1:
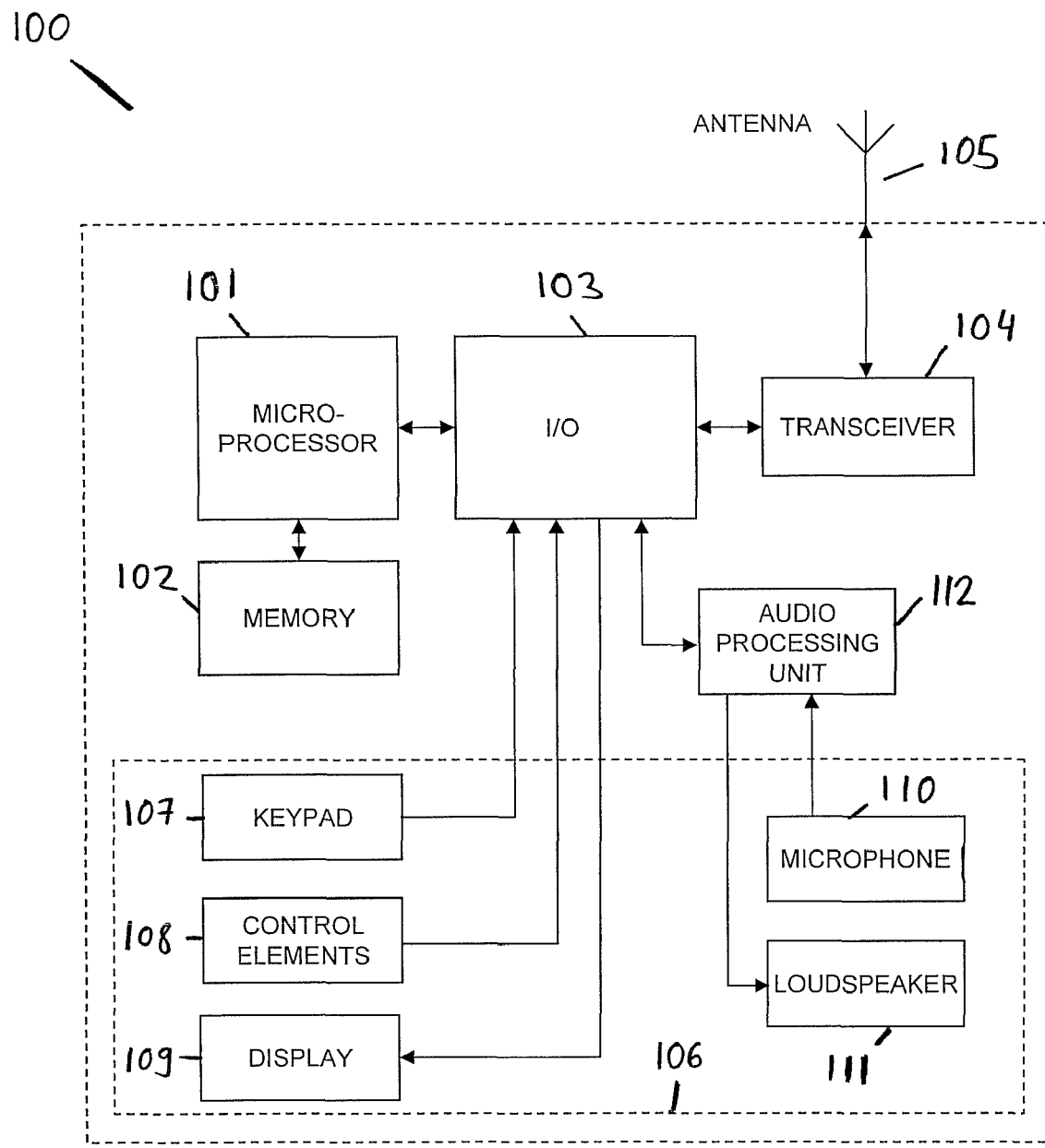
FIG. 1 is a schematic block diagram of a mobile electronic device according to an embodiment of the invention.

In the following, embodiments of the present invention will be described in detail with reference to the accompanying drawings. It is to be understood that the following description of embodiments is given only for the purpose of illustration and is not to be taken in a limiting sense. The scope of the invention is not intended to be limited neither by the embodiments described hereinafter nor by the drawings, which are taken to be illustrative only, but is intended to be limited only by the appended claims and equivalents thereof.

It should be noted that the drawings are to be regarded as being schematic representations only, and elements in the drawings are not necessarily to scale with each other. Rather, the representation of the various elements is chosen such that their function and general purpose become apparent to a person skilled in the art.

It is also to be understood that the following description of embodiments, any direct connection or coupling between functional blocks, devices, components, circuit elements or other physical or functional units shown in the drawings or described herein, i.e. any connection or coupling without intervening elements, could also be implemented by an indirect connection or coupling, i.e. a connection or coupling with one or more additional intervening elements. Furthermore, it should be appreciated that the partitioning of embodiments in functional blocks or units shown in the drawings is not to be construed as indicating that these units necessarily are implemented as physically separate units, but functional blocks or units shown or described may be implemented as separate units, circuits, chips or circuit elements, but one or more functional blocks or units may as well be implemented in a common circuit, chip, circuit element or unit.

Also, it should be clear that the term "application" is to be understood in its broadest meaning. It comprises any piece of code that can be run on e.g. an mobile electronic device. It may for example be what is generally called a 'service' or, it may be any type of software program.

FIG. 1 schematically shows a mobile electronic device 100 comprising a processing unit in form of microprocessor 101 and a memory 102. The microprocessor 101 controls the operation of the device 100 according to programs stored in memory 102. Microprocessor 101 may be implemented as a single microprocessor or as multiple microprocessors, in the form of a general purpose or special purpose microprocessor, or of one or more digital signal processors. Memory 102 may comprise all forms of memory, such as random access memory (RAM), read only memory (ROM), none volatile memory such as EPROM or EEPROM, flash memory or a hard drive. Some of these types of memory may be removable from the communication device 100, e.g. a flash memory card, while others may be integrated for example with microprocessor 101. Data objects, such as picture, video or sound files, address information, telephone numbers, URLs, and the like may be stored in memory 102. Memory 102 may further store an association list with actions registered for particular types of data objects.

Mobile electronic device 100 further comprises transceiver 104, which may implement a receiver unit for communication over a communication network. Transceiver 104 may be a fully functional transceiver of a digital telephone and may thus be used to establish a phone connection over a digital telephone network to other communication devices. In other embodiments, transceiver 104 may be implemented as a fully functional cellular radio transceiver, a network interface, such as an ethernet interface, a wireless network transceiver, or a radio transceiver. Depending on the implementation, transceiver 104 may work according to any suitable known standard. The transceiver may for example work according to the Global System for Mobile communications (GSM), TIA/EIA-136, CDMA one, CDMA 2000, UMTS, or wideband-CDMA standard. Further standards, according to which transceiver 104 may work, comprise ISDN, ATM, GPRS, Bluetooth, a wireless standard such as IEEE 802.L, Ethernet or EDGE and the like. Transceiver 104 may also be adapted for serial bus or universal serial bus (USB) communication. Transceiver 104 may accordingly provide different services for mobile communication or for communication via a cable, and may thus interface one or more antennas or a cable.

In the embodiment of FIG. 1, transceiver 104 interfaces antenna 105 for mobile communication via e.g. GSM, UTMS, GPRS and the like. Transceiver 104 is configured to receive both data packets and voice streams. Transceiver 104 interfaces microprocessor 101 via input/output unit 103.

Mobile electronic device 100 further comprises a user interface 106. User interface 106 comprises keypad 107 by which a user may enter information and operate the mobile electronic device 100. Keypad 107 may for example comprise alphanumeric keys and may be used to enter a telephone number or a user ID for establishing a connection via transceiver 104, for typing-in a text or the like. User interface 106 further comprises control elements 108, which may include simple buttons, turn-push buttons, rockers, joystick-like control elements, and similar. Display 109 interfaces input/output unit 103 and may be used to provide information to a user of device 100. Displayed information may comprise a function menu, service information, contact information, images, web pages and the like. Using control elements 108, the user may for example select an object or a function displayed on display 109, execute such a function, or manipulate an object. Display 109 may for example be implemented as a LCD or TFT screen.

User interface 106 further comprises microphone 110 and loudspeaker 111. For voice communication over a communication network, such as a GSM network, microphone 110 records the voice of a user of mobile electronic device 100, whereas loudspeaker 111 reproduces a received voice signal. Audio processing unit 112 may for example convert a received digital voice signal to an analog voice signal, and it interfaces loudspeaker 112 for giving out the analog voice signal. Audio processing unit 112 further interfaces microphone 110 for digitizing a recorded analog voice signal and for providing the digitized voice signal via input/output unit 103 to either microprocessor 101 or transceiver 104. Mobile electronic device 100 thus provides voice communication over a wireless communication network.

Microprocessor 101 may run different types of applications stored in memory 102. This may for example be a system application or operating system for generally operating device 100, or applications specific to a task, such as a picture viewer, a web browser and the like. Most applications can perform a particular action with a certain type of data object. A picture viewer application is for example capable of displaying an image file on a display 109, whereas a web browser application is capable of communicating with a server designated by an URL, e.g. via transceiver 104. Different types of data objects may be designated by a particular file extension (e.g. .jpg, .png, .zip, . . . ) or by an MIME-type (Multipurpose Internet Mail Extension-type), such as text/plane, image/jpeg, audio/x-wav or the like. Device 100 stores an association list in memory 102 associating different types of data objects with actions that the applications installed on device 100 can perform with the data objects. These actions are herein called local actions and the association list may associate the local action with a pointer to the application installed on device 100.

Further, a proxy application may be stored in memory 102 and may be run on processor 101. The proxy application may communicate with a server via transceiver 104 and may actively download meta data from a server. On the other hand, meta data may be received from a server, e.g. in a message such as an SMS, and the proxy application may be started up upon receiving the meta data. The proxy application running on microprocessor 101 may then register actions comprised in the meta data as remote actions, which will be explained in more detail later. The remote actions are also included in the association list and are associated with a pointer to the proxy application. When selecting a data object in an application running on microprocessor 101, the application may enquire the operating system running on microprocessor 101 about actions available for the type of the selected data object. The system may access the association list and compile a list of actions for the data object type. The list can also comprise one or more remote actions, and upon the user selecting a remote action, the proxy application is started. The proxy application running on microprocessor 101 can then access a remote server having the associated application stored thereon via transceiver 104, and download the application e.g. using GPRS or UMTS. The proxy application can then further install the downloaded application in memory 102 and run the application on microprocessor 101. The application is then running locally and can perform the action selected by the user of mobile electronic device 100.

By receiving the meta data and registering the actions comprised therein, mobile electronic device 100 can provide an up-to-date list of actions for different types of data objects to a user. Applications corresponding to actions not selected by the user do not need to be installed on mobile electronic device 100. As the providing the list of actions as well as the installing of an application corresponding to a remote action is performed automatically by device 100, the user is fast and efficiently provided with an extended functionality.

Mobile electronic device 100 may for example be implemented as a mobile phone, a personal digital assistant, a portable media player, a portable communication device or a portable computer. A person skilled in the art will appreciate that other implementations are also possible and are within the scope of the present invention. Accordingly, some of the components shown in FIG. 1 are of optional. For example when implemented as a portable media player, components 110 and 105 do not need to be provided. The device may instead comprise a connector for headphones and may receive meta data via a USB interface implemented in transceiver 104. It should also be clear that device 100 may comprise further components, such as a digital camera, a graphics processing unit, and other components common to a mobile electronic device.

Figure 2:
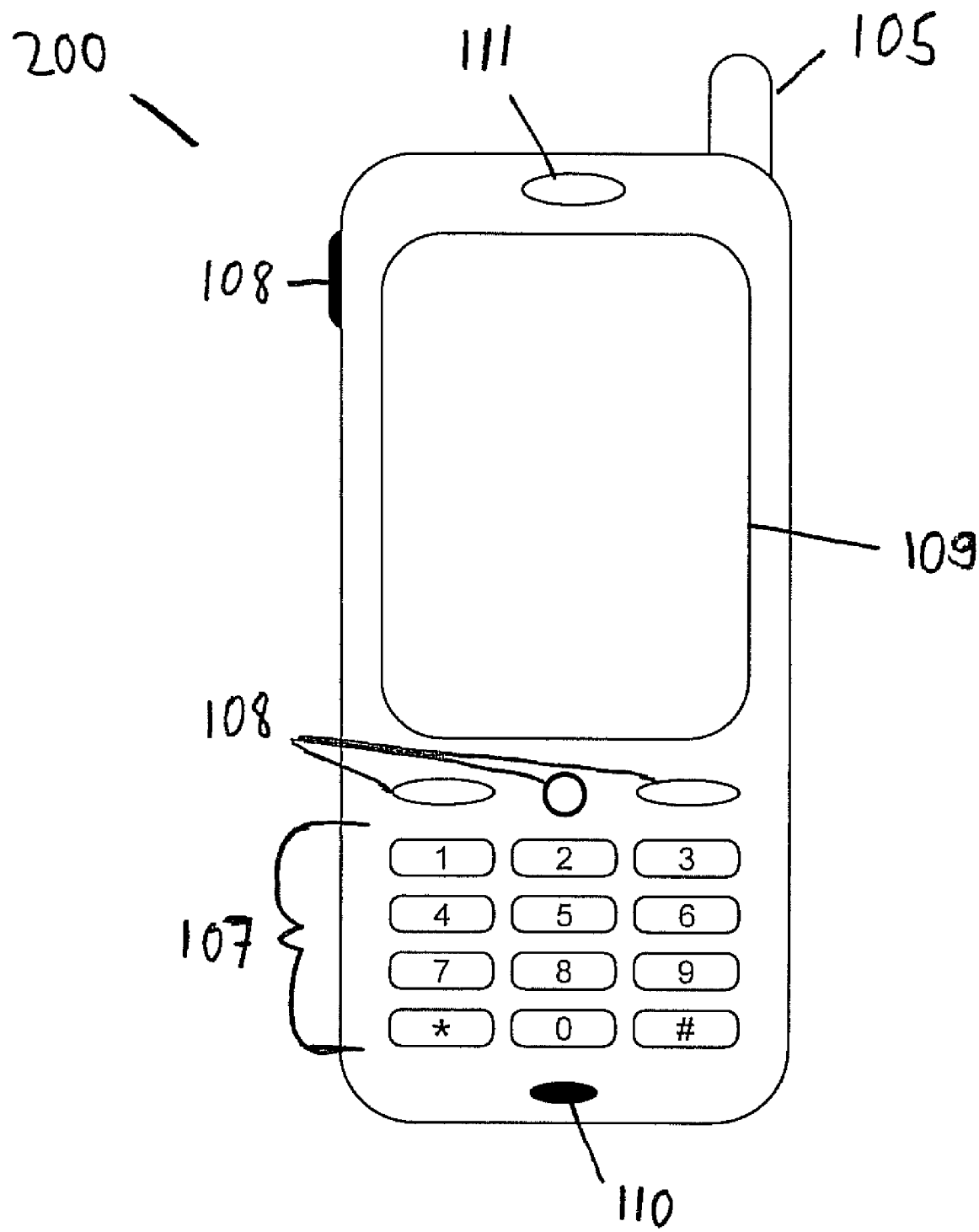
FIG. 2 is a schematic drawing of a mobile electronic device according to an embodiment of the invention implemented as a mobile phone.

FIG. 2 shows an implementation of the mobile electronic device as a mobile phone 200. Mobile phone 200 is operated by keypad 107 and control elements 108. Data objects, as well as corresponding lists of actions can be displayed on display 109. Mobile phone 200 can receive meta data via antenna 105 using e.g. the GPRS or the UMTS standard.

Figure 3:
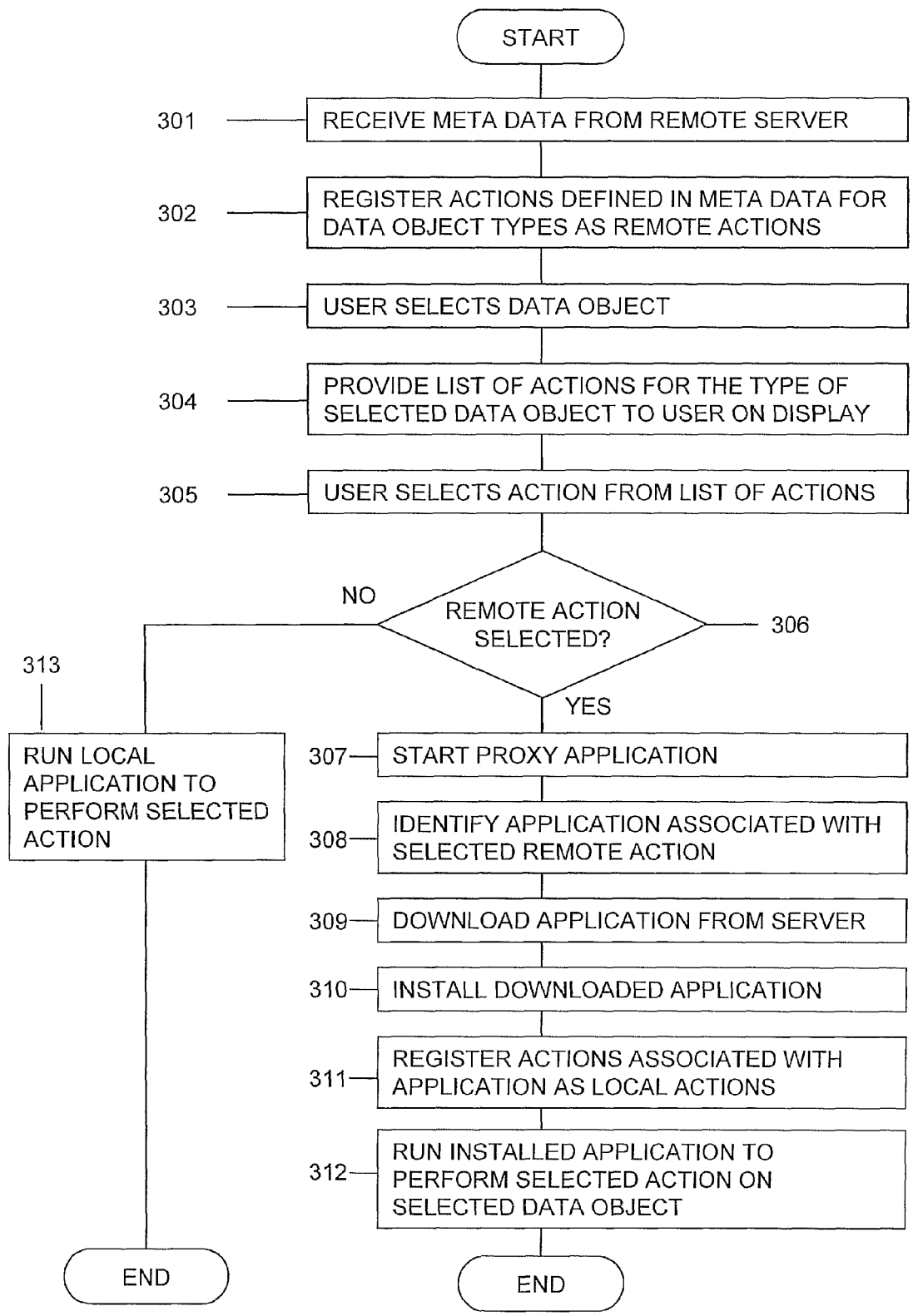
FIG. 3 is a schematic flow diagram showing a method according to an embodiment of the invention.

FIG. 3 shows a flow diagram illustrating a method according to an embodiment of the invention. The method may for example be performed by mobile electronic device 100 or mobile phone 200. In a first step 301, meta data is received from a remote server e.g. via transceiver 104. The remote server stores a number of applications and compiles a file with the meta data which can be downloaded from the server. An example of such meta data is shown in FIG. 4. The meta data 400 comprises information which associates an action of a certain application with a particular type of data object. Applications stored on the remote server are shown in column 403 of the table shown in FIG. 4. The application may be identified by a name, an identification code, a file name or the like. Each application may be capable of performing one or more actions, the actions being shown in column 402. Each application is capable of performing the associates action on a particular type of data object shown in column 401. The application may be capable of performing the action on more than one type of data object, as indicated in the second row of the table. An application may also be capable of performing different actions with the same type of data object, such as displaying an image and modifying an image. The data object type may be identified by an MIME-type or the ending of a file corresponding to the data object, a name, an identifier or the like. In the example of FIG. 4, the application FLICKR-UPLOAD.EXE is capable of uploading image files with the endings .jpg, .bmp and .png to the Flicker web server. The application PICV1.1 is capable of displaying image files with the ending .jpg. The application SYNC-APP.EXE is capable of synchronizing an address object or a vCARD e.g. with information stored on a computing device. The meta data may further comprise the address of the server at which the application is available, e.g. an IP address as shown in column 404. By knowing the IP address and the application name, the corresponding file can be identified on a remote server. In other embodiments, a default server address may be used, and the meta data may only comprise an application identifier, or the application identifier may itself comprise the server address.

By receiving the meta data, the mobile electronic device now has information on which applications available on the remote server can perform which actions on a particular type of data object. In a next step 302, the actions defined in the received meta data are registered for the associated data object types as remote actions. This may for example be performed by a proxy application running on the mobile electronic device and receiving the meta data. The mobile electronic device may for example comprise an association list in which the data object types are registered and associated with actions and applications. An example of such an association list is shown in FIG. 5. The association list 500 comprises a first column 501 with data object types, for example .jpg. For the data object type .jpg, different actions are registered in column 502. These actions are associated with applications as shown in column 503. In the example of FIG. 5, the action "SHOW" for the type .jpg is associated with the local picture viewer application. The actions for the type .jpg received with the meta data 400 are registered as remote actions. Accordingly, the actions are associated with the proxy application in the present embodiment, and not with a local application, as shown in FIG. 5. Thus, for one object type, several local actions of local applications and several remote actions may be registered. The association table 500 may further comprise a column 504 indicating whether the associated application is a local (L) or a remote (R) application, i.e. an application stored on a remote server. Further, the list may comprise a column 505 indicating a size for the remote application. This is advantageous as time required and costs incurred for downloading a particular application from the remote server generally depend on the file size.

The proxy application may check regularly, e.g. at predetermined times, after predetermined periods of times or after predetermined events, such as switching on the mobile electronic device, whether new meta data is available on the remote server. It can then automatically perform the downloading of the meta data and the registering of the actions defined in the meta data. The user of the mobile electronic device may also be queried about whether the meta data should be downloaded.

Figure 6:
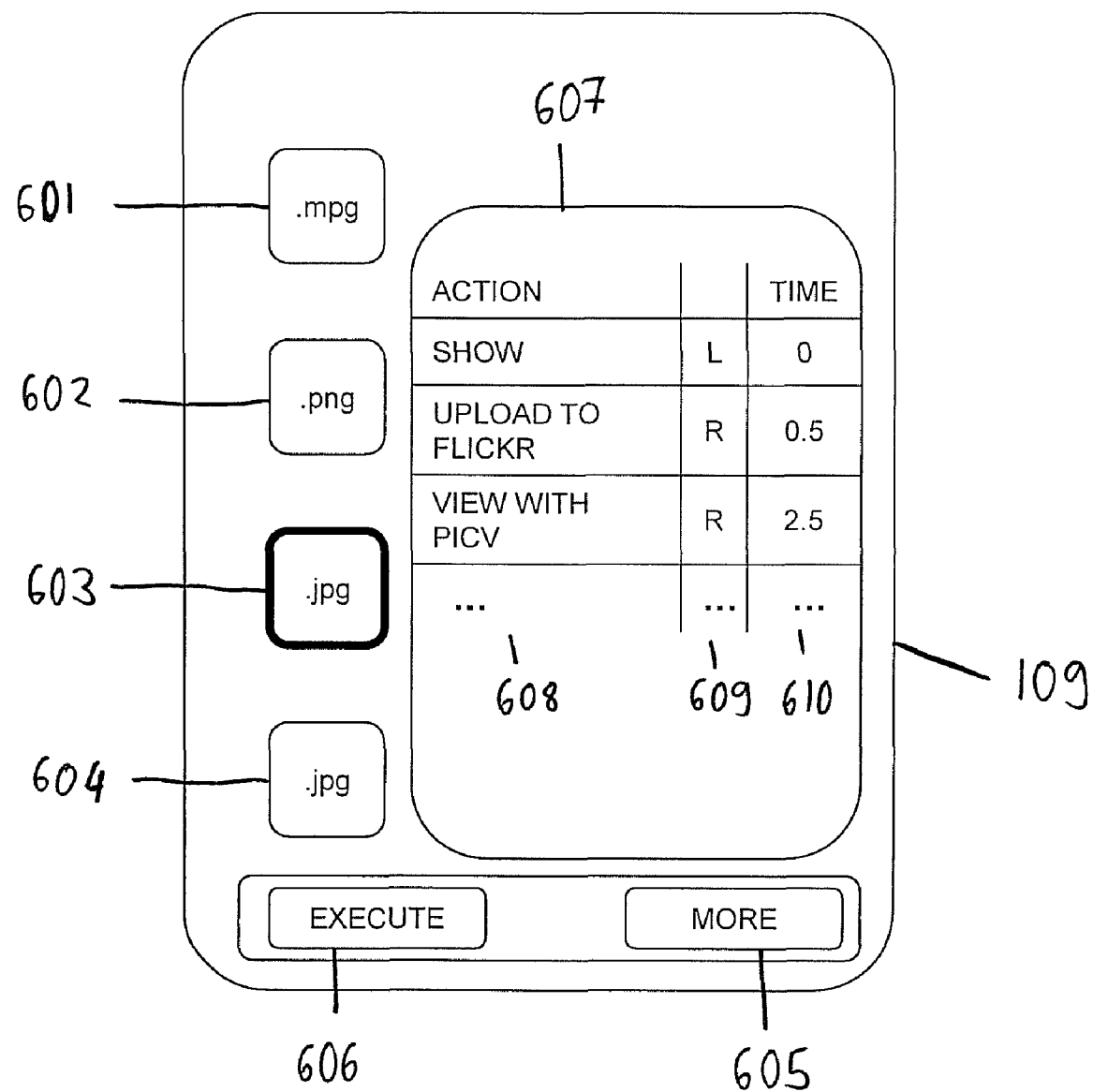
FIG. 6 is a schematic drawing illustrating a list of actions provided on a display of a mobile electronic device according to an embodiment of the invention for a data object of a particular type.

The mobile electronic device can run local applications, such as an operating system or programs for performing specific tasks, most of which are capable of handling contents or data objects. Examples are file managers in which files stored on the mobile electronic device are displayed as icons to the user, address book, which displays data objects in form of address entries to a user, an application for organizing and displaying picture files and the like. In the example of FIG. 6, the application running on the mobile electronic device displays on display 109 a number of icons corresponding to data objects 601-604. In the present example, the data objects are picture files of a particular type as indicated with the file name ending in FIG. 6. In step 303 of the method of FIG. 3, the user selects one of the data objects. As indicated in the drawing of FIG. 6, the user has selected the data object 603 by moving a mark or a cursor over the data object and actuating the MORE function 605 e.g. by using a control element 108. It should be clear that this is only one example of how a selection of object 603 can be performed, and that the selection may also be performed in many other ways, such as by using a pointer actuated by a joystick-like control element or a 4-way rocker to point to the desired object and select it by actuating a specified button. Other examples include the use of a list of data objects and dedicated control elements for scrolling down the list and selecting an object, or a touch screen possibly in combination with buttons to point to and select a desired object, a trackball and the like.

After a selection of a data object by the user in step 303, a list of actions for the data object type of the selected data object is provided to the user on the display (step 304 in FIG. 3). Again turning to FIG. 6, the list of actions 607 is provided to the user on display 109. As an example, the list of actions may be obtained as follows. The application providing the different data objects 601-604 to the user may query the system, e.g. the operating system running on the mobile electronic device, for registered actions that are available for the type of the selected data object. The system may look up the association list 500 shown in FIG. 5 and provide the application issuing the request with the actions available for the selected data object type. Due to the regular downloading of meta data, the list of actions available for the data object type may be extensive, so that it may be unfeasible to provide all actions to the user. Accordingly, the system or the application requesting the information may select the actions in the list of actions according to one or more predetermined criterions. Such criterions may be the frequency of use of the action by the user, the frequency of use of the action by other users, a recommendation of the action by other users or a rating of the action, and the like. For remote actions, information on the basis of which the selection may be performed may be provided together with the meta data. The meta data may for example comprise a rating of the actions, or a frequency of use of the actions by other users, and this information may be stored in the association list 500. It is also possible that the user himself may configure which actions are to be included in the list of actions, or which criterion is used for generating the list of actions. As a result, a list of actions of suitable length comprising actions that are most likely to be desired by the user can be provided to the user. It should be clear that the list of actions may comprise one or more local actions, i.e. actions of applications running locally on the mobile electronic device, and one or more remote actions.

As shown in FIG. 6, the list of actions 607 may apart from the actions themselves in column 608 comprise further information in columns 609 and 610. The actions are presented to the user in form of a string. The string may be translated into the user's language, e.g. in accordance with a language setting of the mobile electronic device. Column 609 indicates whether the action is a local action (L) or a remote action (R). Column 610 indicates the time in minutes expected to be required for downloading and installing the remote application associated with the corresponding action. The operating system may for example calculate the required time by making use of size information provided in column 505 of the association list 500 and a local configuration of the mobile electronic device, e.g. an available network speed for a connection to the remote server providing the application. Yet the time required for downloading may also be calculated by the proxy application when registering the action and may also be stored in the association list. Additionally to or instead of the time required for downloading, the size of the application may directly be provided to the user. It should be clear that providing columns 610 and 610 of the list of actions 607 is optional. It should be clear that the information provided in columns 609 and 610 may also be provided in another form, such as in the form of graphical items, or may be provided at a later stage, e.g. after the user selecting a particular action from the list of actions.

As an example, the top five rated actions, or the five most recommended actions by friends of the user, or the top five most globally used actions may be provided in the list of actions. The applications included in the meta data may be open to application creators around the world, or may only comprise applications of a particular provider, such as the manufacturer of the mobile electronic device, or a telecommunications network provider, or other selected third parties.

The user is thus provided with a list comprising a plurality of up to date actions which can be performed on the selected data object 603. The user can now choose between more actions than provided by the locally installed applications. Further, the user does not have to remember which applications can process which type of data objects, where these applications are stored or available, and he does not have to manually install the applications in order to be provided with their functionality in the list of actions. When a new application becomes available on a remote server, the corresponding actions can be shortly afterwards registered on the mobile electronic device and provided to the user in the list of actions. The user is thus provided with an up to date functionality when needed, i.e. when selecting the data object, without having to install a large number of applications.

Turning back to FIG. 3, a user selects an action from the list of actions in step 305. Using again a cursor, a pointer or a graphical mark, the user may for example highlight the desired action and operate the execute function 606, e.g. by actuating a corresponding control element. The application running on the mobile electronic device may then issue a corresponding request to the operating system for identifying the associated application in the association list 500, or may itself identify the associated application. If for example the action "show" of the list 607 is selected, the associated global picture viewer (column 503 in FIG. 5) is started on the mobile electronic device in order to perform the selected action (step 313). As the remote actions are associated with the proxy application, the proxy application is started in step 307 if a remote action is selected by the user. In step 308, the proxy application identifies the application associated with the selected remote action, e.g. by making use of the meta data 400. The proxy application then identifies the remote server on which the application is available, and starts to download the application from the server in step 309. Before starting the download, the proxy application may also ask the user whether he wishes to download the application, at which time the user may again be provided with information about the application, such as file size, time required for downloading and the like. Downloading in step 308 may then only be started if the user answers the request in the affirmative.

In a next step 310, the downloaded application is installed on the mobile electronic device. The downloaded application may then register its actions with the system wherein the corresponding entry in the association list 500 may be changed. A registration may also be performed by the proxy application. The actions associated with the applications are now registered as local actions, and the corresponding actions may be removed from the proxy application. As an example, the user selects the action "upload to flicker" from the lists of actions 607, in response to which the "flicker-upload.exe" file is downloaded from the remote server and installed on the mobile electronic device. In the association list, the "upload to flicker" action is then registered with the installed "flicker-upload" application, and marked as local. The action can then be removed from the meta data handled by the proxy application.

In a next step 312, the installed application is run on the mobile electronic device to perform the action selected by the user on the selected data objects. For example, the action "upload to flicker" is forwarded from the proxy application to the installed "flicker-upload" application, which then handles the selected action. Even though the application was previously not installed on the mobile electronic device, the user can select the remote action which is then carried out by the application after installation. As the whole process may be performed automatically, the user is not required to manually download and install the application, and may hardly notice the automatic downloading and installing if the mobile electronic device has a fast network connection. The installation of the application and the executing of the desired action can thus be triggered seamlessly. By operating a mobile electronic device with the method of the present embodiment, actions of uninstalled applications can be provided and integrated inside other application running locally on the mobile electronic device and handling data objects. The functionality of the local application is thus greatly enhanced.

The next time the same action, e.g. "upload to flicker" is selected, the installed application is directly started, as the action is now a local action associated with the locally installed application. The proxy application does thus not need to be involved. The user will incur the delay from downloading the application thus only once.

The user may choose to install the application for this action only. Then the application may be uninstalled again after usage.

As a result, actions of applications stored on a remote server become available on the mobile electronic device precisely at the time when needed, i.e. when handling a corresponding type of data object.

The application may also comprise digital rights management (DRM) restrictions. These may for example be a limited number or no forwarding of the application, a limited number of uses of the application, or a limited period of time over which the application may be used.

Figure 7:
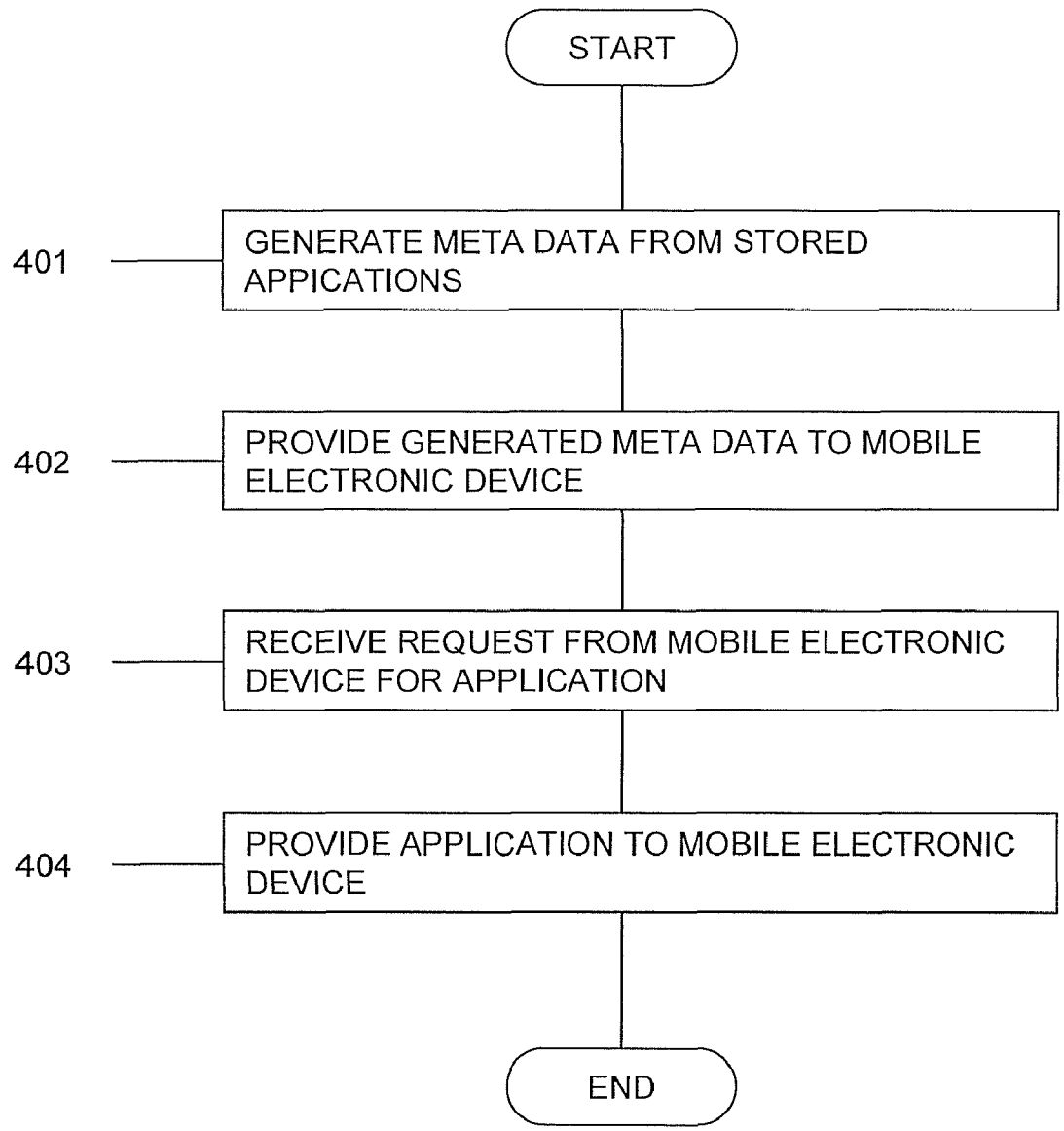
FIG. 7 is a flow diagram illustrating a method performed at a server according to an embodiment of the invention.

FIG. 7 is a flow diagram of a method of operating a server storing a plurality of applications. The server may for example communicate on the basis of the internet protocol, and may thus be accessible over the internet. The server may communicate with a host computer via the internet, or with a mobile electronic device e.g. via a media gateway and a mobile communication network. Other means that may be used for communication between the server and the mobile electronic device are wireless network, Bluetooth, Ethernet, USB and the like.

In a first step 401, the server generates meta data from stored applications. The server may for example extract information regarding the actions an application stored on a server is capable to perform, on what type of data objects these actions can be performed, and what file size the application has. Accordingly, the server may generate meta data as shown in FIG. 4. In a next step 402, the generated meta data is provided to a mobile electronic device. This can be achieved by one or a combination of the above-mentioned communication means. The server may actively send the meta data to the mobile electronic device, or may provide the meta data in response to a request from the mobile electronic device. It should be clear that there may be direct communication between the server and the mobile electronic device, but that the communication may also go via intermediate devices. The meta data may for example be first transferred to a host computer, from which it is downloaded to the mobile electronic device e.g. via USB.

As described with respect to FIG. 3, the user of the mobile electronic device may now select a remote action provided with the meta data. The proxy application of the mobile electronic device may thus send a request for the associated application to the server. The requests from the mobile electronic device for the application is received at the server in step 403. The request may comprise an identifier of the application, such as a file name, an application name, an identification code or the like. In the step 404 the server then provides the requested application to the mobile electronic device. The server may for example use IP for sending the application in data packets to the mobile electronic device. The skilled person will appreciate that other means for transporting the application from the server to the mobile electronic device are available and may be used, and that these are comprised within the scope of the invention. Accordingly, by implementing the above method, the server enables the mobile electronic device to increase its functionality, and provides the application with the associated actions at the time when needed.

It is to be understood that the features of the embodiments described above may be combined with each other. As an example, the mobile electronic device 100 or the mobile phone 200 may implement the method described with respect to FIG. 3. Further, these devices may run a proxy application handling meta data as described with respect to FIG. 4, and may register actions as described with respect to FIG. 5. Also, the list of actions may be provided to a user as described with respect to FIG. 6. Those skilled in the art will thus appreciate from the foregoing description that the teachings of the present invention can be implemented in a variety of forms.

Accordingly, while specific embodiments of the invention are disclosed herein, various changes and modifications can be made without departing from the scope of the invention. The present embodiments are to be considered in all respects as illustrated and non restrictive, and all changes coming within the meaning and equivalence range of the appended claims are intended to be embraced therein.

The invention claimed is:

1. A method of operating a mobile electronic device, comprising the steps of:
   receiving at the mobile electronic device information on at least one action an application is capable of performing on at least one type of data object, the at least one action being associated with the application and the at least one type of data object, the information being received for a plurality of applications stored on at least one remote server;
   registering the at least one action comprised in the received information for the at least one associated type of data object as a remote action in the mobile electronic device, including associating the at least one action with a proxy application running locally on said mobile electronic device, the proxy application being capable of connecting to a remote server having the application associated with the at least one action stored thereon;
   in response to a user selecting a data object of a type for which at least one remote action is registered, the data object being stored on the mobile electronic device, providing at the mobile electronic device a list of actions for the selected data object to the user, the list of actions comprising at least one of the remote actions registered for the type of the selected data object;
   in response to the user selecting the at least one remote action provided with said list of actions, downloading the associated application from said remote server to the mobile electronic device; and
   executing the downloaded application on the mobile electronic device for performing the action corresponding to the selected remote action with the selected data object,
   wherein in response to the user selecting the at least one remote action comprised in the list of actions, the proxy application is executed and performs the following steps:
   identifying an application associated with the selected remote action and a remote server having the application stored thereon;
   downloading the application from the identified remote server to the mobile electronic device;

installing the downloaded application on the mobile electronic device;

registering at the mobile electronic device the selected remote action as a local action of the installed application; and running the installed application on the mobile electronic device for performing the action corresponding to the registered local action on the selected data object.

2. The method of claim 1, further comprising the steps of, after downloading, installing the application on the mobile electronic device and registering the action associated with the installed application as a local action local to the mobile electronic device.

3. The method of claim 1, further comprising the step of, in response to the user selecting the at least one remote action provided with said list of actions, issuing at the mobile electronic device a request to the user on whether the application associated with the selected remote action should be downloaded from the remote server to the mobile electronic device, wherein said downloading and said executing is only performed in response to the user answering the request in the affirmative.

4. The method of claim 1, wherein the at least one remote action comprised in the list of actions is selected from plural remote actions registered for the type of the selected data object according to a predetermined criterion.

5. The method of claim 4, wherein the predetermined criterion is selected from a group comprising a rating of the remote actions, a recommendation of the remote actions by other users, a frequency of use of the remote actions, and a promotion of actions by an advertisement provider.

6. The method of claim 1, wherein said information is received by said proxy application, the proxy application being configured to download data comprising the information from a remote server to the mobile electronic device and to perform said registering, the downloading of the data being time and/or event triggered.

7. The method of claim 1, further comprising the step of providing an information element for the at least one remote action in said list of actions, the information element comprising at least one indication selected from a group comprising: an indication that the remote action corresponds to an application not locally stored on the mobile electronic device, an indication on a size of the application corresponding to the remote action, an indication on an amount of time expected to be required for downloading the application corresponding to the remote action to the mobile electronic device, a cost associated with downloading the application, an indication on a provider providing the application, an indication on a receiver or scoring of the application, and an indication on a frequency of use of the application by another person.

8. The method of claim 1, wherein the list of actions further comprises at least one local action which can be performed by an associated application running locally on the mobile electronic device.

9. A mobile electronic device, comprising:

a receiver unit adapted to receive information on at least one action an application is capable of performing on at least one type of data object, the at least one action being associated with the application and the at least one type of data object, the receiver unit being adapted to receive the information for a plurality of applications stored on at least one remote server;

a processing unit adapted to register the at least one action comprised in the received information for the at least one associated type of data object as a remote action, the processing unit configured to associate the at least one action with a proxy application running locally on said mobile electronic device, the proxy application being capable of connecting to a remote server having the application associated with the at least one action stored thereon;

a memory to store a plurality of data objects; and an input unit to enable a user of the mobile electronic device to select one of said data objects stored in said memory, wherein the processing unit is further adapted to:

in response to a user selecting one of said data objects of a type for which at least one remote action is registered, provide a list of actions for the selected data object to the user, the list of actions comprising at least one of the remote actions registered for the type of the selected data object;

in response to the user selecting the at least one remote action provided with said list of actions, download the associated application from said remote server to the mobile electronic device; and execute the downloaded application on the mobile electronic device for performing the action corresponding to the selected remote action with the selected data object, wherein in response to the user selecting the at least one remote action comprised in the list of actions, the proxy application is executed and performs the following steps:

identifying an application associated with the selected remote action and a remote server having the application stored thereon;

downloading the application from the identified remote server to the mobile electronic device;

installing the downloaded application on the mobile electronic device;

registering at the mobile electronic device the selected remote action as a local action of the installed application; and running the installed application on the mobile electronic device for performing the action corresponding to the registered local action on the selected data object.

10. The mobile electronic device of claim 9, wherein the processing unit is further adapted to run a proxy application, the at least one registered remote action being linked to said proxy application, the proxy application being capable of connecting to a remote server having the application associated with the at least one remote action stored thereon.

11. The mobile electronic device of claim 10, wherein the proxy application is configured to perform the following steps in response to the user selecting the at least one remote action comprised in the list of actions:

identifying an application associated with the selected remote action and a remote server having the application stored thereon;

downloading the application from the identified remote server to the mobile electronic device;

installing the downloaded application on the mobile electronic device;

registering at the mobile electronic device the selected remote action as a local action of the installed application;

running the installed application on the mobile electronic device for performing the action corresponding to the registered local action on the selected data object.

12. The mobile electronic device of claim 9, wherein the memory is adapted to store an association list comprising at least one data object type stored in association with at least one associated action comprised in the received information and an identifier of the associated application.

13. The mobile electronic device of claim 12, wherein the list further comprises an identifier of a remoter server on which the associated application is available.

14. The mobile electronic device of claim 9, wherein the processing unit is adapted to include the at least one remote action in the list of actions on the basis of a predetermined criterion.

15. The mobile electronic device of claim 9, wherein the mobile electronic device is selected from a group comprising a mobile phone, a personal digital assistant, a portable media player, a portable communication device, a vehicle computer and a portable computer.

16. A method of operating a server, the server storing a plurality of applications, the method comprising the steps of:
   generating, at the server, data comprising information on at least one action an application stored on the server is capable of performing on at least one type of data object;
   providing the generated data to at least one mobile electronic device;
   in response to receiving, at the server, a request from the at least one mobile electronic device for the application capable of performing the at least one action comprised in the information, providing the application to the at least one mobile electronic device; and
   registering the at least one action as a remote action in the mobile electronic device, including associating the at least one action with a proxy application running locally on said mobile electronic device, the proxy application being capable of connecting to the server having the application associated with the at least one action stored thereon,
   wherein in response to a user selecting the at least one remote action comprised in a list of actions, the proxy application is executed and performs the following steps:
   identifying an application associated with the selected remote action and a remote server having the application stored thereon;
   downloading the application from the identified remote server to the mobile electronic device;
   installing the downloaded application on the mobile electronic device;
   registering at the mobile electronic device the selected remote action as a local action of the installed application; and
   running the installed application on the mobile electronic device for performing the action corresponding to the registered local action on the selected data object.

17. A server adapted to provide an application to a mobile electronic device, comprising:
   a memory unit adapted to store a plurality of applications;
   a processing unit adapted to generate data comprising information on at least one action an application stored on the server is capable of performing on at least one type of data object;
   a network interface adapted to provide the generated data to at least one mobile electronic device;
   wherein the processing unit is further adapted to provide, in response to receiving a request from the at least one mobile electronic device for the application capable of performing the at least one action comprised in the information, the application to the at least one mobile electronic device via said network interface,
   the at least one action is registered as a remote action in the mobile electronic device, and the at least one action is associated with a proxy application running locally on said mobile electronic device, the proxy application being capable of connecting to the server having the application associated with the at least one action stored thereon, and
   in response to a user selecting the at least one remote action comprised in a list of actions, the proxy application is executed and performs the following steps:
   identifying an application associated with the selected remote action and a remote server having the application stored thereon;
   downloading the application from the identified remote server to the mobile electronic device;
   installing the downloaded application on the mobile electronic device;
   registering at the mobile electronic device the selected remote action as a local action of the installed application; and
   running the installed application on the mobile electronic device for performing the action corresponding to the registered local action on the selected data object.

* * * * *